(12) United States Patent
Cialini et al.

(10) Patent No.: US 8,392,763 B2
(45) Date of Patent: Mar. 5, 2013

(54) TECHNIQUE FOR ESTIMATION OF CONFIDENCE INTERVAL FOR PROBABILITY OF DEFECT REDISCOVERY

(75) Inventors: Enzo Cialini, Mississauga (CA); David R Godwin, Whitby (CA); Andriy V Miranskyy, London (CA)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 12/625,355

(22) Filed: Nov. 24, 2009

(65) Prior Publication Data

US 2011/0125654 A1    May 26, 2011

(51) Int. Cl.
*G06F 11/00* (2006.01)
(52) U.S. Cl. ............ 714/38.1; 714/47.1; 714/25; 714/48
(58) Field of Classification Search .................. 714/38.1, 714/25
See application file for complete search history.

(56) References Cited

U.S. PATENT DOCUMENTS

| | | | |
|---|---|---|---|
| 2006/0143492 A1* | 6/2006 | LeDuc et al. | 714/2 |
| 2006/0168479 A1* | 7/2006 | Gittins et al. | 714/38 |
| 2008/0235764 A1* | 9/2008 | Cohen et al. | 726/2 |
| 2008/0263507 A1* | 10/2008 | Chang et al. | 717/104 |
| 2009/0306933 A1* | 12/2009 | Chan et al. | 702/181 |
| 2010/0251027 A1* | 9/2010 | Yawalkar et al. | 714/38 |
| 2010/0251215 A1* | 9/2010 | Yawalkar et al. | 717/125 |

OTHER PUBLICATIONS

Paul Luo Li, Mary Shaw, Jim Herbsleb, P. Santhanam, Bonnie Ray; "An Empirical Comparison of Field Defect Modeling Methods"; Institute for Software Research International, Carnegie Mellon University, Pittsburgh, PA; 2006.
Stefan Biffl, Wilfried Grossmann; "Evaluating the Accuracy of Defect Estimation Models Based on Inspection Data From Two Inspection Cycles"; Software Engineering, 2001; ICSE 2001 Proceedings of the 23rd International Conference; May 2001; pp. 145-154.
Lionel C. Briand, Khaled El Emam, Bernd G. Griemut, Oliver Laitenberger; "A Comprehensive Evaluation of Capture-Recapture Models for Estimating Software Defect Content"; IEEE Transactions on Software Engineering; vol. 26, Issue 6; pp. 518-540; Jun. 2000.

* cited by examiner

*Primary Examiner* — Scott Baderman
*Assistant Examiner* — Sarai Butler
(74) *Attorney, Agent, or Firm* — North Shore Patents, P.C.; Michele Liu Baillie

(57) ABSTRACT

A present invention for estimating a confidence interval includes: receiving a dataset comprising information on software product defects found by a first customer and a second customer, the information comprising numbers of cases of software product defects found by the first customer and the second customer; determining a probability for each case of found software product defect using the frequencies and a total number of software product defects found; determining a plurality of bootstrapping draws from the cases of found software product defects in the dataset; determining an array of conditional probabilities that the first customer may find a given software product defect given that the second customer found the given software product defect, using the numbers of the cases and the probabilities corresponding to the cases in each bootstrapping draw; and determining a confidence interval for the determined plurality of arrays of conditional probabilities.

21 Claims, 6 Drawing Sheets

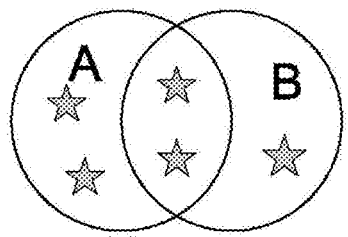

- Total number of events (stars) = 5
- P(A) = 4/5 ; P(B) = 3/5
- P(A∩B) = P(A and B) = 2/5
- Conditional probability: P(A will rediscover defect given that B discovered it) = P(A|B)
- P(A|B) = P(A∩B)/P(B) = (2/5)/(3/5) = 2/3
- P(B|A) = P(A∩B)/P(A) = (2/5)/(4/5) = 2/4

FIG. 2

CASE 1
- Number of defects found by A = 100
- Number of defects found by B = 2
- Number of defects found by A and B = 1
- P(A) = 98/100; P(B) = 2/101
- P(A∩B) = P(A and B) = 1/101
- $P_1$(A|B) = (1/101)/(2/101) = 0.5

- If number of defects found by B=3 then
- P(A) = 98/102; P(B) = 3/102
- P(A∩B) = 1/102
- $P_2$(A|B) = (1/102)/(3/102) ≈ 0.333
- $P_1$(A|B) − $P_2$(A|B) ≈ 0.167

CASE 2
- Number of defects found by A = 100
- Number of defects found by B = 100
- Number of defects found by A and B = 50
- P(A) = 100/150; P(B) = 100/150
- P(A∩B) = P(A and B) = 50/150
- $P_1$(A|B) = (50/150)/(100/150) = 0.5

- If number of defects found by B=101 then
- P(A) = 100/151; P(B) = 101/151
- P(A∩B) = 50/151
- $P_2$(A|B) = (50/151)/(101/151) ≈ 0.495
- $P_1$(A|B) − $P_2$(A|B) ≈ 0.005

FIG. 3

| Case # | No. of defects found by Customer A | No. of defects found by Customer B | No. of defects found by Customers A and B | P(A|B) lower boundary of 95% confidence interval | P(A|B) upper boundary of 95% confidence interval |
|---|---|---|---|---|---|
| 1 | 100 | 2 | 1 | 0.00 | 1.00 |
| 1 | 100 | 3 | 1 | 0.00 | 1.00 |
| 2 | 100 | 100 | 50 | 0.40 | 0.60 |
| 2 | 100 | 101 | 50 | 0.40 | 0.60 |

FIG. 8

```
1   Input:
    a; // total number of defects found by A
    b; // number of defects found by A and B
    c; // total number of defects found by B
    N; // number of bootstrapping draws
    ci_alpha; // confidence interval significance level Begin:
    //sanity check
2   if (b == 0 and c == 0) {
3       die "Customer B has no defects at all!"
    }

4   l = a - b + c; #total number of defects

//Cases:
    //Case 1 = found by A, not found by B
    //Case 2 = found by A and B
    //Case 3 = found by B, not found by A
5   cases = [ 1,2,3 ];
6   p_cases = [ (a-b)/l, b/l, (c-b)/l ]; //probabilities of cases 7   for (i from 1 to N ){
8       prob_arr[i] = calculateConditinalProbability(p_cases, cases);
    }
9   (lower_bound, upper_bound) = calculateConfidenceInterval(prob_arr, ci_alpha);

10  return (lower_bound, upper_bound);
    End
```

FIG. 5

```
1   calculateConditinalProbability(probabilities, cases){

//this loop is put in place to prevent p(B) from being set to zero
        //during numerical procedure of sampling (in this case conditional
        //probability becomes undefined)
2       do {
3               s = sample cases with probabilities
4       } while (length(s[s == 2])>0 or length (s[s == 3])>0)

5       p(A∩B) = length( s[ s == 2 ] ) / l;
6       p(B) = p(A∩B) + length( s[ s == 3 ] ) / l;
7       p(A|B) = p(A∩B) / p(B);
8       return p(A|B);
    }
```

FIG. 6A

```
1   calculateConfidenceInterval(arr, alpha){

//approximation of confidence interval using normal distribution
        //(other techniques can be used)
        //we assume reasonable length of arr (>30)

2       delta = qnorm(1 – alpha / 2) * ((variance(arr) / length(arr))^0.5;
3       avg = mean (arr);
4       lower_bound = avg – delta;
5       upper_bound = avg + delta;
6       return (lower_bound, upper_bound);
    }
```

FIG. 6B

```
1   Input:
    a; // total number of defects found by A
    b; // number of defect found by A and B
    c; // total number of defects found by B
    MAX_N; // maximum number of bootstrapping draws
    E; // error factor of fluctuation of confidence interval
    ci_alpha; // confidence interval significance level Begin:

//sanity check
2   if (b == 0 and c == 0) {
3       die "Customer B has no defects at all!"
    }

4   l = a - b + c; #total number of defects

//Cases:
    //Case 1 = found by A, not found by B
    //Case 2 = found by A and B
    //Case 3 = found by B, not found by A
5   cases = [ 1,2,3 ];
6   p_cases = [ (a-b)/l, b/l, (c-b)/l ]; //probabilities of cases 7   prob_arr[1] = calculateConditinalProbability(p_cases, cases);
8   prev_confidence_interval = 1E20; // dummy init with a large number;
9   relative_error = 1E20; // dummy init with a large number;
10  for( i = 2; relative_error < E or i < MAX_N; i++){
11      prob_arr[i] = calculateConditinalProbability(p_cases, cases);
12      (lower_bound, upper_bound) = calculateConfidenceInterval(prob_arr, ci_alpha);
13      current_confidence_interval = upper_bound - lower_bound;
14      relative_error = (prev_confidence_interval – current_confidence_interval ) / prev_confidence_interval;
15      prev_confidence_interval = current_confidence_interval;
    }
16  if( i >= MAX_N and relative_error >= E ){
17      print("Warning: maximum number of iterations exceeded, relative error = " . relative_error);
    }
18  return (lower_bound, upper_bound);
    End
```

FIG. 7

TECHNIQUE FOR ESTIMATION OF CONFIDENCE INTERVAL FOR PROBABILITY OF DEFECT REDISCOVERY

BACKGROUND

Software products are often distributed to customers with defects. After a defect is found in the field by customers, a maintenance team of the software product provider prepares a fix and makes the fix available to customers to download and install. However, many customers do not install the fix for any number of reasons. For example, administrators of complex systems may prefer to focus on a particular subset of functionalities and may not focus on the functionality related to the fix. A customer's failure to install the fix may lead to defect rediscovery, where a known software product defect, already discovered by one customer, is rediscovered by another customer.

BRIEF SUMMARY

According to one embodiment of the present invention, a method for estimating a confidence interval for a probability of software product defect rediscovery includes: receiving a dataset comprising information on software product defects found by a first customer and a second customer, the information comprising numbers of cases of software product defects found by the first customer and the second customer; determining a probability for each case of found software product defect using the frequencies and a total number of software product defects found; determining a plurality of bootstrapping draws from the cases of found software product defects in the dataset; determining an array of conditional probabilities that the first customer may find a given software product defect given that the second customer found the given software product defect, using the numbers of the cases and the probabilities corresponding to the cases in each bootstrapping draw; and determining a confidence interval for the determined plurality of arrays of conditional probabilities.

Other embodiments of the present invention include a computer program product and a system operationally coupled to the computer program product.

BRIEF DESCRIPTION OF THE SEVERAL VIEWS OF THE DRAWINGS

FIG. 2 illustrates an example of a determination of conditional probability.

FIG. 3 illustrates the effect of a new defect on small and large defect datasets.

FIG. 5*illustrates* an embodiment of a function for determining the confidence interval for a probability of software product defect rediscovery.

FIG. 6A illustrates an embodiment of the calculateConditinalProbability function.

FIG. 6B illustrates an embodiment of the calculateConfidenceInterval function.

FIG. 7 illustrates an alternative embodiment of a function for determining the confidence interval for a probability of software product defect rediscovery.

FIG. 8 illustrates example confidence interval values for the example cases in FIG. 3 determined using the method of the present invention.

DETAILED DESCRIPTION

Figure 1:
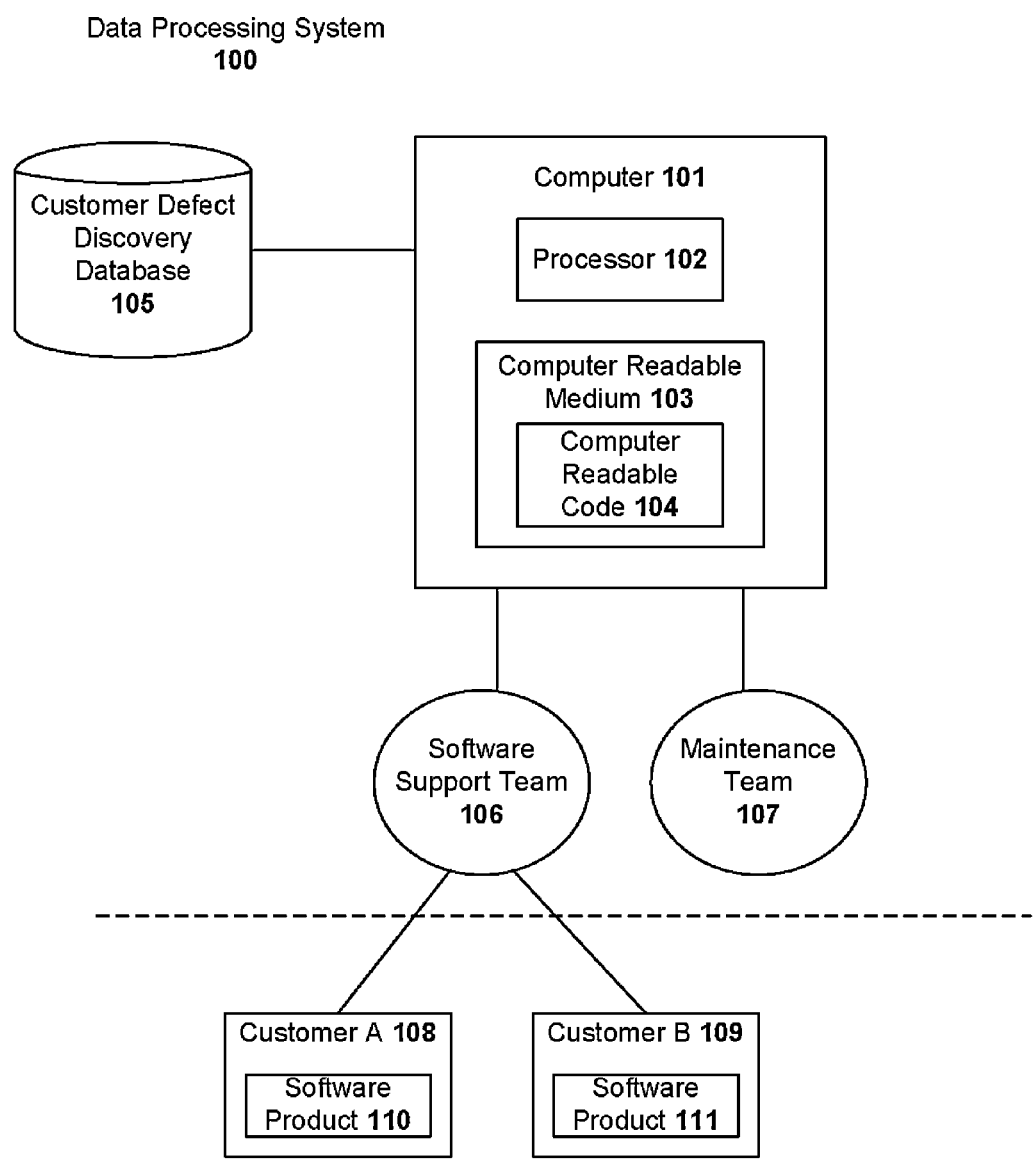
FIG. 1 illustrates an example data processing system utilizing an embodiment of the present invention.

Once a given customer discovers a software product defect, and the maintenance team of the software product provider prepares a fix, the identification of other customers who may rediscover the same defect may allow proactive action on the part of the software product provider. For example, the maintenance team may use this information to prioritize the inclusion of fixes for defects in the next service pack. For another example, the software support team of the software product provider can contact the identified customers, before they actually rediscover the defect, and advise them to install the defect's fix.

The present invention provides an approach to identifying the customers who may rediscover a defect by determining the probability that one customer may rediscover the defect given that another customer has discovered the defect.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an example data processing system utilizing an embodiment of the present invention. The system 100 includes a computer 101 of a software product provider (not shown) and a customer defect discovery database 105. Supporting the software product are the software support team 106 and the maintenance team 107. A plurality of customers 108-109 utilizes the software product 110-111 of the software product provider. Although FIG. 1 illustrates two customers, any number of customers may utilize the software product.

The customer defect discovery database 105 stores historical information concerning customers 108-109, their support requests, and the defects in the software product 110-111 found by the customers 108-109. These discovered defects can be mapped to functionalities of the software product 110-111, and customers with overlapping defects and/or use of functionalities can be identified. The computer 101 is operationally coupled to a processor 102 and a computer readable medium 103 The computer readable medium 103 stores computer readable program code 104 for implementing the method of the present invention. The processor 102 executes the program code 104 to determine a probability of rediscovery of a given software product defect.

In order to identify the customers who may experience defect rediscovery, two values are determined: conditional probability (P(A|B)); and confidence interval (CI). P(A|B) is determined from the historical data concerning found defects stored in the customer defect discovery database 105, and can be expressed as:

$$P(A \mid B) = \frac{\text{probability } A \text{ and } B \text{ discover defect}}{\text{probability that } B \text{ discovers defect}} = \frac{P(A \cap B)}{P(B)}$$

FIG. 2 illustrates an example of a determination of conditional probability. In this example, assume that there are a total of five defects, represented by stars. Assume also that the probability of customer A discovering a given defect and the probability of customer B discovering the given defect are, respectively, P(A)=4/5 and P(B)=3/5. The probability that customer A and customer B will discover the same defect: P(A∩B)=P(A and B)=2/5. The conditional probability that customer A will discover a given defect given that customer B found the defect:

$$P(A\mid B) = \frac{P(A\cap B)}{P(B)} = \frac{2/5}{3/5} = \frac{2}{3}.$$

The conditional probability that customer B will discover a given defect given that customer A found the defect:

$$P(B\mid A) = \frac{P(A\cap B)}{P(A)} = \frac{2/5}{4/5} = \frac{2}{4}.$$

The estimation of the CI for P(A|B) depends on the number of defects discovered by customer B. The larger the number of defects found by customer B, the more robust will be the determined conditional probability. However, when dealing with small defect datasets, the addition of a single defect to the dataset leads to a dramatic change in P(A|B). FIG. 3 illustrates the effect of a new defect on small and large defect datasets. Case 1 illustrates a small dataset. In Case 1, the number of defects found by customer A is 100, and the number of defects found by customer B is 2. The number of defects found by customers A and B is 1. This leads to the probabilities: P(A)=98/100; P(B)=2/101; and P(A∩B)=1/101. The conditional probability is thus:

$$P_1(A\mid B) = \frac{1/101}{2/101} = 0.5.$$

If the number of defects found by customer B=3, then this leads to the probabilities: P(A)=98/102; P(B)=3/102; and P(A∩B)=1/102. The conditional probability is thus:

$$P_2(A\mid B) = \frac{1/102}{3/102} = 0.333.$$

The difference between $P_1$ and $P_2$ is approximately 0.167.

Case 2 illustrates a larger dataset. In Case 2, the number of defects found by customer A is 100, and the number of defects found by customer B is 100. The number of defects found by customers A and B is 50. This leads to the probabilities: P(A)=100/150; P(B)=100/150; and P(A∩B)=50/150. The conditional probability is thus:

$$P_1(A\mid B) = \frac{50/150}{100/150} = 0.5.$$

If the number of defects found by customer B=101, then this leads to the probabilities: P(A)=100/151; P(B)=101/151; and P(A∩B)=50/151. The conditional probability is thus:

$$P_2(A\mid B) = \frac{50/151}{101/151} = 0.495.$$

The difference between $P_1$ and $P_2$ is approximately 0.005. As illustrated, the change in P(A|B) for the small dataset in Case 1 is more dramatic than for the larger dataset in Case 2.

Formal analysis of CI can be performed using z-statistics. However, z-statistics assumes that the data is normally distributed. If the dataset if not normally distributed, then by the Law of Large Numbers, it converges to normal distribution for a sufficiently large dataset. Thus, when the dataset is small, the Law of Large Numbers is inapplicable. To overcome this limitation, the present invention uses a numerical bootstrapping technique in the determination of P (A|B) and CI. Bootstrapping is the practice of estimating properties of an estimator by measuring those properties when sampling from an approximating distribution, such as the empirical distribution of observed data. In bootstrapping, alternative versions of a small dataset or small sample (resamples) are gathered, creating a larger dataset that represents what would have been "seen" in a large sample.

Figure 4:
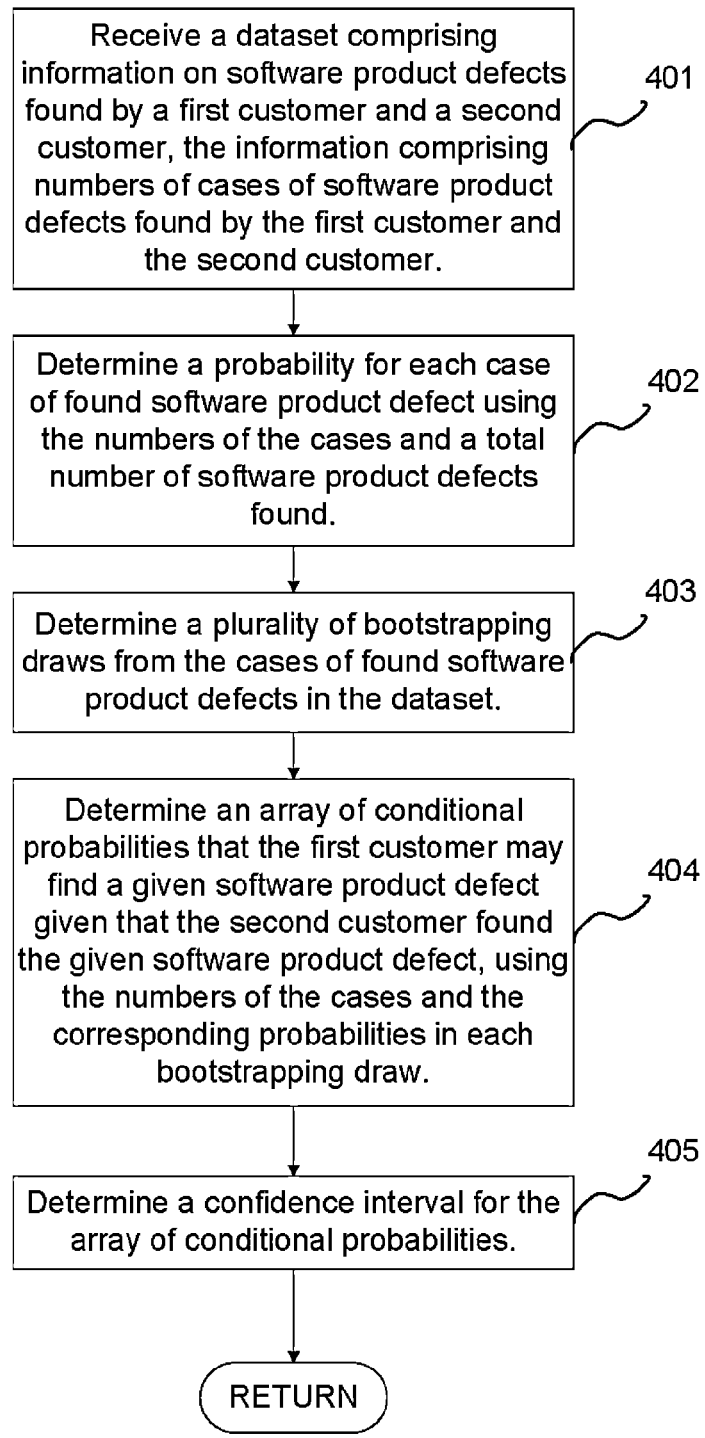
FIG. 4 is a flowchart illustrating an embodiment of a method for determining a confidence interval for a probability of software product defect rediscovery using a bootstrapping technique.

FIG. 4 is a flowchart illustrating an embodiment of a method for determining a confidence interval for a probability of software product defect rediscovery using a bootstrapping technique. In this embodiment, the method is implemented by computer readable program code 104 (FIG. 1) executed by a processor 102. In the method, a dataset is received, where the dataset comprises information on software product defects found by a first customer (such as customer A 108) and a second customer (such as customer B 109) (step 401). The information comprises numbers of cases of software product defects found by the first customer and the second customer. Using the numbers of the cases and a total number of software product defects found, a probability for each case of found software product defect is determined (step 402). A plurality of bootstrapping draws from the cases of found software product defects in the dataset are then determined (step 403). Using the numbers of the cases and the probabilities corresponding to the cases of found software product defects in each bootstrapping draw, an array of conditional probabilities that the first customer may find a software product defect given that the second customer found the software product defect, i.e., P(A|B), is determined (step 404). A confidence interval (CI) of array of conditional probabilities is determined (step 405).

FIGS. 5-7 illustrate in more detail the embodiment of the method for determining a confidence interval for a probability of software product defect rediscovery using a bootstrapping technique. In FIGS. 5-7, the embodiment is described as functions called as part of the computer readable program code 104.

FIG. 5 illustrates an embodiment of a function for determining the confidence interval for a probability of software product defect rediscovery. In this function 500, the number of bootstrapping draws is fixed and predetermined. The function 500 receives the several inputs (line 1):

a total number of software product defects found a customer A 108;
    b number of software product defects found by customer A 108 and customer B 109;
    c total number of software product defects found by customer B 109;
    N number of bootstrapping draws; and
    ci_alpha confidence interval significance level.

The function 500 begins with a "sanity check" (lines 2 and 3), i.e., checks if b and c are both zero. If so, then customer B 109 has found no software product defects at all, and the function 500 exits. Otherwise, the function 500 determines the total number of defects as: l=a−b+c (line 4).

In this embodiment, cases are defined to include:

Case 1=software product defects found by customer A 108 but not found by customer B 109);

Case 2=software product defects found by customer A 108 and customer B 109; and Case 3=software product defects found by customer B 109 but not found by customer A 108.

Thus, cases=⌈1,2,3⌉ (line 5). The probabilities of the cases are also determined as:

$$p\_cases = \left\lceil \frac{a-b}{l}, \frac{b}{l}, \frac{c-b}{l} \right\rceil \text{ (line 6).}$$

The function 500 next determines the conditional probability array (prob_arr[i]) by calling the calculateConditinalProbability function (line 8). The values of p_cases and cases are passed to the calculateConditinalProbability function as parameters. The calling of the calculateConditinalProbability function is repeated N times, i.e., to achieve the predetermined number of bootstrapping draws (line 7).

FIG. 6A illustrates an embodiment of the calculateConditinalProbability function. The calculateConditinalProbability function 601 is passed p_cases and cases as values of probabilities and cases, respectively. A bootstrapping draw, s, is defined as a sample of cases with the cases' corresponding probabilities (line 3). The loop from line 2 to line 4 prevents P(B) from being set to zero during the numerical procedure of sampling, as when P(B) is zero, the conditional probability becomes undefined. The function 601 then determines P(A∩B) as the number of Case 2 defects in the bootstrapping draw (s) divided by the total number of defects (l) (line 5). The function 601 also determines P(B) as P(A∩B) plus the number of Case 3 defects in the bootstrapping draw (s) divided by the total number of defects (l) (line 6). P(A|B) for the bootstrapping draw (s) is then determined to be P(A∩B) divided by P(B) (line 7). The value of P(A|B) is then returned by the function 601.

Returning to FIG. 5, at line 8, the returned value of P(A|B) by function 601 is stored as an element in the conditional probability array, prob_arr[i]. Once the function is called N times, prob_arr[i] contains an array of conditional probabilities for N number of bootstrapping draws. Next, the function 500 determines the lower bound (lower_bound) and upper bound (upper_bound) of the CI by calling the calculateConfidenceInterval function (line 9). The conditional probability array (prob_arr) and the confidence interval significance level (ci_alpha) are passed to the calculateConfidenceInterval function as parameters.

FIG. 6B illustrates an embodiment of the calculateConfidenceInterval function. The calculateconfidenceInterval function 602 is passed prob_arr and ci_alpha as values of arr and alpha, respectively (line 1). In this embodiment, the function 602 approximates the confidence interval using normal distribution, however, other techniques may be used without departing from the spirit and scope of the present invention. The function 602 first determines delta as:

$$\text{delta} = qnorm\left(1 - \frac{alpha}{2}\right) \cdot \left(\frac{varience(arr)}{length(arr)}\right)^{0.5}.$$

In this equation, $$qnorm\left(1 - \frac{alpha}{2}\right)$$

is the number of standard deviations extending from the mean of a normal distribution of arr required to contain an alpha amount of the area under the curve. Further, $$\left(\frac{varience(arr)}{length(arr)}\right)^{0.5}$$

is the standard error of the mean. The function 602 also determines avg as the mean of arr (line 3). From delta and avg, the function 602 determines the lower bound of CI (lower_bound) as the difference between avg and delta (line 4). The function 602 further determines the upper bound of CI (upper_bound) as the sum of avg and delta (line 5). The values of lower_bound and upper_bound are returned by the function 602 (line 6).

Returning to FIG. 5, the returned values of lower_bound and upper_bound by the function 602 becomes the values of lower_bound and upper_bound, respectively, of the function 500, which is in turn returned by the function 500.

FIG. 7 illustrates an alternative embodiment of a function for determining the confidence interval for a probability of software product defect rediscovery. In this alternative function 700, the number of bootstrapping draws is not fixed. Instead, the case resampling is repeated until a maximum number of iterations is reached or an error tolerance level in the fluctuation of the CI is reached. The function 700 receives several inputs (line 1):

a total number of software product defects found by customer A 108;

b number of software product defects found by customer B 109;

c total number of software product defects found by customer B 109;

MAX_N maximum number of bootstrapping draws;

E error factor of fluctuation of confidence interval; and ci_alpha confidence interval significance level.

Like function 500, function 700 begins with the "sanity check" (lines 2 and 3) and with determining the total number of defects (l) (line 4). The same three cases of found software product defects (cases) and their probabilities (p_cases) are defined here as in function 500 (lines 5 and 6).

The function 700 next determines the first conditional probability (prob_arr[1]) by calling the calculateConditinalProbability function 601 (line 7). The function 601 determines and returns prob_arr[1] in the same manner as described above with reference to FIG. 6A. Next, the function 700 sets the initial values of the variables prev_confidence_interval and relative_error to large numbers (lines 8 and 9). Starting with i=2, and while relative_error is less than E or MAX_N is greater than i, lines 11-15 are repeated and i incremented (line 10). In other words, case resampling continues until either the maximum number of bootstrapping draws is reached or exceeded or the error factor is reached or exceeded.

For each i, prob_arr[i] is determined by calling the calculateConditinalProbabilty function 601 (line 11), and lower_bound and upper_bound are determined by calling the calculateConfidenceInterval function 602 (line 12). The calculateConditinalProbability function 601 and the calculateConfidenceInterval function 602 are described above with reference to FIGS. 6A and 6B, respectively. Further for each i:

current_confidence_interval = upper_bound − lower_bound (line 13);

relative_error =

$$\left(\frac{\text{prev\_confidence\_interval} - \text{current\_confidence\_interval}}{\text{prev\_confidence\_interval}}\right) \text{(line 14);}$$

and prev_confidence_interval = current_confidence_interval (line 15).

If i is equal to or greater than MAX_N and relative_error is equal to or less than E, a warning is printed (line 17). Otherwise, the function 700 returns the values of lower_bound and upper_bound, giving the CI. The CI can be interpreted as "in X % of cases of found software product defects, the resulting conditional probability should fall in the following interval. In statistical analysis, the standard value of X is equal to 95% but other values of X can be used.

FIG. 8 illustrates example confidence interval values for the example cases in FIG. 3 determined using the method of the present invention. As illustrated, the CI for Case 1 ranges between 0 and 1. Therefore, the results are insignificant and cannot be trusted. The 95% CI for Case 2 ranges between 0.4 and 06. This spread is reasonably small and can be used in the analysis of software product defect rediscovery with significant confidence. Once the CI is determined to be significant, this data can be used in a variety of ways, as explained above.

What is claimed is:

1. A method for estimating a confidence interval for a probability of software product defect rediscovery, comprising:
    receiving a dataset comprising information on software product defects found by a first customer and a second customer, the information comprising numbers of cases of software product defects found by the first customer and the second customer;
    determining a probability for each case of found software product defect using the frequencies and a total number of software product defects found;
    determining a plurality of bootstrapping draws from the cases of found software product defects in the dataset;
    determining an array of conditional probabilities that the first customer may find a given software product defect given that the second customer found the given software product defect, using the numbers of the cases and the probabilities corresponding to the cases in each bootstrapping draw; and
    determining a confidence interval for the determined plurality of arrays of conditional probabilities.

2. The method of claim 1, wherein the receiving of the dataset comprising information on software product defects found by the first customer and the second customer comprises:
    receiving a total number of software product defects found by the first customer (a);
    receiving a number of software product defects found by the first customer and the second customer (b); and
    receiving a total number of defects found by the second customer (c).

3. The method of claim 2, wherein the determining of the probability for each case of found software product defect using the frequencies and the total number of software product defects found comprises:
    determining a first number of a first case, the first case comprising software product defects found by the first customer and not found by the second customer;
    determining a second number of a second case, the second case comprising software product defects found by the first customer and found by the second customer; and
    determining a third number of a third case, the third case comprising software product defects not found by the first customer and found by the second customer.

4. The method of claim 3, wherein the determining of the probability for each case of found software product defect using the frequencies and the total number of software product defects found further comprises:
    determining a total number of software product defects found (l) as: l=a−b+c;
    determining a first probability for the first case as equal to: (a−b)/l;
    determining a second probability for the second case as equal to: b/l; and
    determining a third probability for the third case as equal to: (c−b)/l.

5. The method of claim 4, wherein the determining of the array of conditional probabilities that the first customer may find the given software product defect given that the second customer found the given software product defect comprises:
    determining the plurality of bootstrapping draws from the cases of found software product defects in the dataset, wherein each bootstrapping draw comprises a resampling of the cases of found software product defects in the dataset and the probabilities corresponding to the cases in the resampling.

6. The method of claim 5, wherein for each given bootstrapping draw of the plurality of bootstrapping draws, the determining of the array of conditional probabilities that the first customer may find the given software product defect given that the second customer found the given software product defect comprises:
    determining a probability that the first customer and the second customer found a given software product defect (P(A∩B))using the number of the second case in the given bootstrapping draw and the total number of defects;
    determining a probability that the second customer may find the given software product defect (P(B)) using P(A∩B)), the number of the third case in the given bootstrapping draw, and the total number of defects;
    determining a conditional probability for the given bootstrapping draw as equal to:
    P(A∩B)/P(B).

7. The method of claim 1, wherein the determining of the confidence interval for the determined plurality of arrays of conditional probabilities comprises:
    determining a delta for the array as being equal to a product of:
        a number of standard deviations extending from a mean of a normal distribution of the array required to contain a predetermined amount of an area under a curve, and
        a standard error of the mean;
    determining a mean of the array (avg);

determining a lower bound of the confidence interval as equal to avg −delta; and determining an upper bound of the confidence interval as equal to avg +delta.

8. The method of claim 1, wherein the determining of the plurality of bootstrapping draws from the cases of found software product defects in the dataset comprises:

determining a fixed number of bootstrapping draws from the cases of found software product defects in the dataset.

9. The method of claim 1, wherein the determining of the plurality of bootstrapping draws from the cases of found software product defects in the dataset comprises:

determining a variable number of bootstrapping draw from the cases of found software product defects in the dataset.

10. The method of claim 9, wherein the determining of the variable number of bootstrapping draw from the cases of found software product defects in the dataset comprises:

determining resamples of the cases of found software product defects in the dataset until a predetermined maximum number of bootstrapping draws is reached or until a predetermined error tolerance level is reached.

11. A computer program product for estimating a confidence interval for a probability of software product defect rediscovery, the computer program product comprising:

a computer readable storage device having computer readable program code embodied therewith, the computer readable program code comprising computer readable program code configured to:

receive a dataset comprising information on software product defects found by a first customer and a second customer, the information comprising numbers of cases of software product defects found by the first customer and the second customer;

determine a probability for each case of found software product defect using the frequencies and a total number of software product defects found;

determine a plurality of bootstrapping draws from the cases of found software product defects in the dataset;

determine an array of conditional probabilities that the first customer may find a given software product defect given that the second customer found the given software product defect, using the numbers of the cases and the probabilities corresponding to the cases in each bootstrapping draw; and determine a confidence interval for the determined plurality of arrays of conditional probabilities.

12. The product of claim 11, wherein the computer readable program code configured to receive the dataset comprising information on software product defects found by the first customer and the second customer is further configured to:

receive a total number of software product defects found by the first customer (a);

receive a number of software product defects found by the first customer and the second customer (b); and receive a total number of defects found by the second customer (c).

13. The product of claim 12, wherein the computer readable program code configured to determine the probability for each case of found software product defect using the frequencies and the total number of software product defects is further configured to:

determine a first number of a first case, the first case comprising software product defects found by the first customer and not found by the second customer;

determine a second number of a second case, the second case comprising software product defects found by the first customer and found by the second customer; and determine a third number of a third case, the third case comprising software product defects not found by the first customer and found by the second customer.

14. The product of claim 13, wherein the computer readable program code configured to determine the probability for each case of found software product defect using the frequencies and the total number of software product defects found is further configured to:

determine a total number of software product defects found (l) as: l=a−b+c;

determine a first probability for the first case as equal to: (a−b)/l;

determine a second probability for the second case as equal to: b/l; and determine a third probability for the third case as equal to: (c−b)/l.

15. The product of claim 14, wherein the computer readable program code configured to determine the array of conditional probabilities that the first customer may find the given software product defect given that the second customer found the given software product defect is further configured to:

determine the plurality of bootstrapping draws from the cases of found software product defects in the dataset, wherein each bootstrapping draw comprises a resampling of the cases of found software product defects in the dataset and the probabilities corresponding to the cases in the resampling.

16. The product of claim 15, wherein for each given bootstrapping draw of the plurality of bootstrapping draws, the computer readable program code configured to determine the array of conditional probabilities that the first customer may find the given software product defect given that the second customer found the given software product defect is further configured to:

determine a probability that the first customer and the second customer found a given software product defect (P(A∩B)), using the number of the second case in the given bootstrapping draw and the total number of defects;

determine a probability that the second customer may find the given software product defect (P(B)) using P(A∩B), the number of the third case in the given bootstrapping draw, and the total number of defects;

determine a conditional probability for the given bootstrapping draw as equal to:

P(A∩B)/P(B).

17. The product of claim 11, wherein the computer readable program code configured to determine the confidence interval for the determined plurality of arrays of conditional probabilities is further configured to:

determine a delta for the array as being equal to a product of:

a number of standard deviations extending from a mean of a normal distribution of the array required to contain a predetermined amount of an area under a curve, and a standard error of the mean;

determine a mean of the array (avg);

determine a lower bound of the confidence interval as equal to avg −delta; and determine an upper bound of the confidence interval as equal to avg +delta.

18. The product of claim 11, wherein the computer readable program code configured to determine the plurality of bootstrapping draws from the cases of found software product defects in the dataset is further configured to:

determine a fixed number of bootstrapping draws from the cases of found software product defects in the dataset.

19. The product of claim 11, wherein the computer readable program code configured to determine the plurality of bootstrapping draws from the cases of found software product defects in the dataset is further configured to:

determine a variable number of bootstrapping draw from the cases of found software product defects in the dataset.

20. The product of claim 19, wherein the computer readable program code configured to determine the variable number of bootstrapping draw from the cases of found software product defects in the dataset is further configured to:

determine resamples of the cases of found software product defects in the dataset until a predetermined maximum number of bootstrapping draws is reached or until a predetermined error tolerance level is reached.

21. A system comprising:

a customer defect discovery database storing historical information concerning a plurality of customers of a software product and software product defects found by the plurality of customers;

a computer comprising a computer readable storage device having computer readable program code embodied therewith, the computer readable program code configured to:

receiving a dataset comprising information on software product defects found by a first customer and a second customer stored in the customer defect discovery database, the information comprising numbers of cases of software product defects found by the first customer and the second customer;

determining a probability for each case of found software product defect using the frequencies and a total number of software product defects found;

determining a plurality of bootstrapping draws from the cases of found software product defects in the dataset;

determining an array of conditional probabilities that the first customer may find a given software product defect given that the second customer found the given software product defect, using the numbers of the cases and the probabilities corresponding to the cases in each bootstrapping draw; and determining a confidence interval for the determined plurality of arrays of conditional probabilities.

\* \* \* \* \*